No. 693,763. Patented Feb. 18, 1902.
M. L. & W. D. WARNER.
GAS SEPARATOR.
(Application filed Apr. 4, 1900.)
(No Model.)
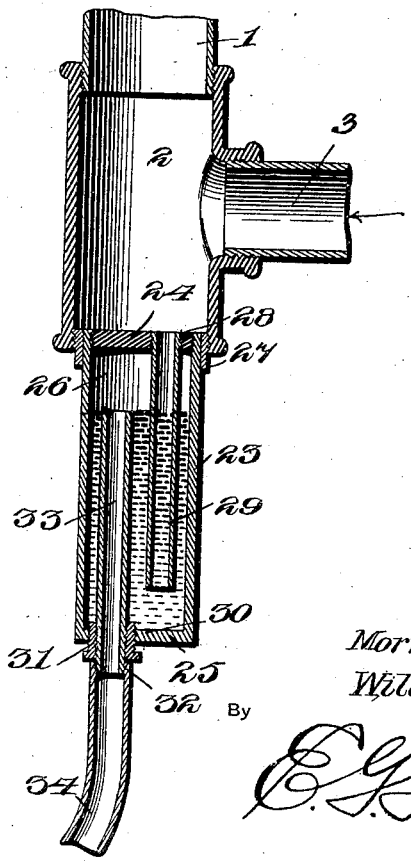
Witnesses
Geo. H. Byrne.
Louis G. Julihn
Morris L. Warner
and
Willard D. Warner.
Inventors
By E. G. Siggers
Attorney
THE NORRIS PETERS CO., PHOTO-LITHO., WASHINGTON, D. C.

United States Patent Office.

MORRIS L. WARNER AND WILLARD D. WARNER, OF HUDSON, MICHIGAN.

GAS-SEPARATOR.

SPECIFICATION forming part of Letters Patent No. 693,763, dated February 18, 1902.

Application filed April 4, 1900. Serial No. 11,525. (No model.)

*To all whom it may concern:*

Be it known that we, MORRIS L. WARNER and WILLARD D. WARNER, citizens of the United States, residing at Hudson, in the county of Lenawee and State of Michigan, have invented a new and useful Gas-Separator, of which the following is a specification.

Our present invention relates to improvements in separating apparatus for gas systems, but more particularly to a separator attachment designed to be applied to illuminating and heating systems at the lowest point thereof for the purpose of freeing the pipes of any accumulation of oil due to condensation or the imperfect vaporization of the gas supplied thereto.

The object of the invention is to provide a drain for the service-pipe system by means of which the sediment and oil which may be present in the service-pipe may be drained off without permitting the escape of gas.

Considered in a more specific aspect, an object of the invention is to provide such a drain in the form of an attachment which may be readily applied to any gas-pipe system either during or after its installation.

To these ends the invention consists in providing a drip or sediment chamber which may be screwed into the lower end of the main service-pipe and having heads at its opposite ends from which extend into the chamber in opposite directions the inlet and outlet pipes so related that the oil discharged into the chamber through the inlet-pipe forms a liquid seal to prevent the escape of gas and is drawn off through the discharge-pipe as soon as it has attained a level above that which is necessary to render the seal effective.

In the accompanying drawing, the figure is a sectional view of the lower end of the main service-pipe with our drain-plug attached.

Referring to the numerals of reference, indicating corresponding parts and features in the view, 1 indicates a service-pipe extending upwardly from a three-way fitting 2, to which is led the gas-supply pipe 3. As the gas is generated and supplied to the system pipes or conduits a certain percentage of oil of low grade will gradually find its way into the pipes of the system, and a certain amount of oil will be formed in the pipes by condensation and the various impurities carried into the service-pipes by the vapor or gas will gradually be deposited with the oil and will gravitate to the lowest point of the system, which is at the fitting 2, located at the bottom or lower end of the main service-pipe. It is for the removal of this accumulation of oil and debris that our present invention has been devised.

The lower end of the fitting 2 is internally threaded for the reception of the externally-threaded upper end of our novel drain-plug 23, which is preferably cylindrical in form and provided with heads 24 and 25, defining an intermediate drain or seal chamber 26. The external threads at the upper end of the plug may be formed in the exterior surface thereof, or, as shown, they may be formed in a separate coupling-ring 27, rings of varying dimensions being employed for the purpose of attaching the plug to fittings of various diameters in order that the plug may be readily attached to systems already installed regardless of the diameters of the gas-mains. The upper head 24 is screwed into the upper end of the hollow plug 23 and is pierced eccentrically by an internally-threaded inlet-orifice 28, into which is screwed the upper threaded end of the drip or inlet pipe 29, depending from the head 24 to a point removed from but adjacent to the lower head 25. The head 25, constituting the bottom of the seal-chamber, may be integral with or otherwise fixed in the lower end of the plug and is pierced eccentrically by a threaded discharge-orifice 30, into which is fitted a threaded collar or thimble 31, into which is screwed in turn the lower threaded end 32 of the outlet or discharge pipe 33, located at one side of the pipe 29 and extending upwardly into the seal-chamber a suitable distance above the lower end of the inlet-pipe and preferably terminating comparatively adjacent to the head 24.

In assembling the drain-plug the inlet-pipe 29 is first screwed into the head 24, which is then screwed into the upper end of the plug. After the inlet-pipe is in place the outlet-pipe 33, with its attached collar, is slipped into the plug to one side of the pipe 29 to permit the sleeve to be securely screwed into the orifice to retain the pipe 33 in its proper position. A coupling-ring 27 of the proper size is now fitted to the upper end of the plug, which latter is screwed into the lower end of the fitting 2, and a suitable drain-pipe 34 having been screwed upon the depending threaded extremity 32 of the pipe 33 the structure is properly organized for use.

It will now appear that the accumulation of oil, impurities, or other debris gravitating to the fitting 2 from the various ramifications of the system will finally escape to the interior of the seal-chamber 26 through the inlet-pipe 29. As soon as sufficient oil has accumulated in the seal-chamber to submerge the lower end of the pipe 29 a liquid seal will be formed and the escape of gas from the conduits or mains of the system will be prevented. Continued accumulation, however, will raise the level of oil in the seal-chamber to the upper end of the discharge-pipe 33 and will be drained off through said pipe to the drain-pipe 34. It will be obvious, however, that the depth of the seal may be regulated in accordance with the gas-pressure by the longitudinal adjustment of the discharge-pipe 33 within its sleeve 31, which adjustment regulates the distance between the inner ends of the inlet and outlet pipes, and consequently the height of the liquid seal within the chamber, as desired. When the plug is first fitted to the system, it may be provided with a sufficient quantity of oil to form a seal in order that the escape of gas will be prevented during the period which would otherwise elapse between the insertion of the plug and the accumulation of sufficient oil to form the seal.

From the foregoing it will be observed that we have produced a simple and effective self-sealing drain-plug for gas systems adapted to be connected to the gas-main after the installation of the system and without regard to the diameter of the main; but while the present embodiment of our invention appears at this time to be preferable we do not desire to limit ourselves to the structural details defined, but reserve the right to effect such changes, modifications, and variations as may come properly within the scope of the protection prayed.

What we claim is—

In a gas system, the combination with a gas-main having its lower extremity interiorly threaded, of a hollow plug having a threaded coupling-ring surrounding its upper end and screwed into the gas-main, a removable head screwed into the upper end of the plug and pierced by a depending inlet-pipe discharging exclusively at its lower end within the plug, and a longitudinally-adjustable discharge-pipe passed through the lower end of the plug and extended above the exclusive point of discharge of the inlet-pipe to seal the discharge-opening of the inlet-pipe without permitting gas to escape from the main.

In testimony that we claim the foregoing as our own we have hereto affixed our signatures in the presence of two witnesses.

MORRIS L. WARNER.
WILLARD D. WARNER.

Witnesses:
PERCY E. WAREHAM,
CHAS. L. WARNER.